US010858567B2

(12) United States Patent
Osgouei et al.

(10) Patent No.: US 10,858,567 B2
(45) Date of Patent: Dec. 8, 2020

(54) INVERT EMULSIONS HAVING A NON-AQUEOUS BASED INTERNAL PHASE CONTAINING DISSOLVED SALTS

(71) Applicants: Reza Ettehadi Osgouei, Spring, TX (US); Dennis Clapper, Houston, TX (US); Rosa Swartwout, Spring, TX (US)

(72) Inventors: Reza Ettehadi Osgouei, Spring, TX (US); Dennis Clapper, Houston, TX (US); Rosa Swartwout, Spring, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 99 days.

(21) Appl. No.: 16/207,282

(22) Filed: Dec. 3, 2018

(65) Prior Publication Data

US 2019/0185734 A1 Jun. 20, 2019

Related U.S. Application Data

(60) Provisional application No. 62/599,048, filed on Dec. 15, 2017.

(51) Int. Cl.
| | | |
|---|---|---|
| C09K 8/34 | (2006.01) | |
| C09K 8/36 | (2006.01) | |
| C09K 8/502 | (2006.01) | |
| E21B 21/06 | (2006.01) | |
| E21B 7/00 | (2006.01) | |
| E21B 43/22 | (2006.01) | |
| E21B 43/04 | (2006.01) | |

(52) U.S. Cl.
CPC .................. *C09K 8/34* (2013.01); *C09K 8/36* (2013.01); *C09K 8/502* (2013.01); *E21B 43/04* (2013.01)

(58) Field of Classification Search
CPC . C09K 8/36; C09K 8/32; C09K 8/035; C09K 8/28; C09K 8/52; E21B 21/00; E21B 21/003; E21B 43/25; E21B 21/068; E21B 43/04; E21B 21/002; E21B 7/00
See application file for complete search history.

(56) References Cited

U.S. PATENT DOCUMENTS

| | | | |
|---|---|---|---|
| 3,041,275 A | 6/1962 | Lummus et al. | |
| 3,746,109 A | 7/1973 | Darley | |
| 4,508,628 A | 4/1985 | Walker et al. | |
| 5,072,794 A | 12/1991 | Hale et al. | |
| 5,198,416 A | 3/1993 | Hale et al. | |
| 5,348,938 A | 9/1994 | Mueller et al. | |
| 5,436,227 A | 7/1995 | Hale et al. | |
| 5,707,940 A | 1/1998 | Bush et al. | |
| 6,248,698 B1 | 6/2001 | Mullen et al. | |
| 6,291,405 B1 | 9/2001 | Lee et al. | |
| 6,405,809 B2 | 6/2002 | Patel et al. | |
| 7,343,972 B2 | 3/2008 | Willingham et al. | |
| 7,439,210 B2 | 10/2008 | West et al. | |
| 7,507,694 B2 | 3/2009 | Shumway et al. | |
| 7,575,057 B2 | 8/2009 | Schwartz et al. | |
| 7,939,470 B1 | 5/2011 | Wagle et al. | |
| 8,148,303 B2 | 4/2012 | Van Zanten et al. | |
| 8,685,900 B2 | 4/2014 | Ezell et al. | |
| 8,881,822 B2 | 11/2014 | Dakin et al. | |
| 9,644,129 B2 | 5/2017 | Reyes Bautista et al. | |
| 2006/0272815 A1 | 12/2006 | Jones et al. | |
| 2012/0067575 A1 | 3/2012 | Luyster et al. | |
| 2012/0258893 A1 | 10/2012 | Deville | |
| 2013/0020081 A1 | 1/2013 | Maghrabi et al. | |
| 2013/0165351 A1 | 6/2013 | Tej et al. | |
| 2014/0066338 A1 | 3/2014 | Wagle et al. | |
| 2017/0073565 A1* | 3/2017 | McDaniel | E21B 21/08 |
| 2017/0073566 A1 | 3/2017 | Pober | |

FOREIGN PATENT DOCUMENTS

| | | |
|---|---|---|
| RU | 2501828 C1 | 12/2013 |
| WO | 9214798 A1 | 9/1992 |
| WO | 9619545 A1 | 6/1996 |
| WO | 2009047480 A1 | 4/2009 |

OTHER PUBLICATIONS

Harlan, et al.; "Salt-Free Internal Phase Oil Mud Provides Improved Performance"; 2006; AADE Drilling Fluids Technical Conference; 9 pages.

Notification of Transmittal of the International Search Report and the Written Opinion of the International Searching Authority, or the Declaration; PCT/US2018/064386 dated Mar. 27, 2019; 12 pages.

* cited by examiner

*Primary Examiner* — Zakiya W Bates
(74) *Attorney, Agent, or Firm* — Cantor Colburn LLP

(57) ABSTRACT

A method of drilling and completing a wellbore in a subterranean formation comprises circulating an invert oil emulsion fluid in the subterranean formation; the invert oil emulsion fluid comprising an oil phase, an emulsifier, and an internal phase comprising an alcohol other than a polycyclicpolyetherpolyol with molecular weight in excess of 50,000 and a salt dissolved in the alcohol, wherein the alcohol and the salt are selected such that the salt has a solubility in the alcohol of greater than about 3 g/100 ml at 23° C.

22 Claims, No Drawings

INVERT EMULSIONS HAVING A NON-AQUEOUS BASED INTERNAL PHASE CONTAINING DISSOLVED SALTS

CROSS-REFERENCE TO RELATED APPLICATIONS

The present application claims priority to U.S. Provisional Patent Application No. 62/599,048, filed Dec. 15, 2017. The contents of the priority application are hereby incorporated by reference in their entirety.

BACKGROUND

This disclosure relates to wellbore fluids having controlled equivalent circulating density, and applications thereof in downhole applications.

Frictional pressure is an important parameter to minimize for numerous types of wellbore fluids. Frictional pressure is incurred when a fluid is under dynamic conditions such as circulation in the wellbore and its magnitude is influenced by flow rate. Frictional pressure is further influenced by the composition of the fluid as well as the fluid properties such as rheology and density. A widely referenced metric in industry is equivalent circulating density (ECD) which is frictional pressure caused by the fluid circulating through the annulus of the open hole and the casing(s) on its way back to the surface plus hydrostatic pressure. Controlling ECD can be critical in wellbore fluid such as drilling and gravel pack fluids in deep water wells and other wells where the differences in subterranean formation pore pressures and fracture gradients are small. When wellbore fluid pressure exceeds the formation fracture pressure, there is a risk of creating or opening fractures, resulting in loss of fluid circulation and damage to the affected formation. Moreover, an increased ECD can limit the rate of circulation that can be achieved. Due to this circulating pressure increase, the ability to clean the hole is severely restricted. Since many wellbore fluids such as drilling fluids and gravel pack fluids are often used under dynamic conditions, it is desirable to minimize frictional pressure for these fluids. Thus there is a need in the art for drilling fluids and gravel pack fluids that have controlled ECD when used in drilling and completion operations.

BRIEF DESCRIPTION

An invert oil emulsion wellbore fluid comprises an oil phase; an emulsifier; and an internal phase comprising an alcohol other than a polycyclicpolyetherpolyol with a molecular weight in excess of 50,000 Daltons and a salt dissolved in the alcohol, wherein the alcohol and the salt are selected such that the salt has a solubility in the alcohol of greater than about 3 g/100 ml at 23° C., and the wellbore fluid is a drilling fluid or a gravel pack fluid.

The invert oil emulsion wellbore fluid can be a drilling fluid. A method of drilling a wellbore in a subterranean formation comprises circulating the drilling fluid in the subterranean formation.

The invert oil emulsion wellbore fluid can be a gravel pack fluid. A method of forming a gravel pack comprises introducing into the formation a gravel pack fluid comprising an invert emulsion and a gravel, the invert emulsion comprising: an oil phase; an emulsifier; and an internal phase comprising an alcohol other than a polycyclicpolyetherpolyol with a molecular weight in excess of 50,000 Daltons and a salt dissolved in the alcohol, the alcohol and the salt being selected such that the salt has a solubility in the alcohol of greater than about 3 g/100 ml at 23° C.; and placing the gravel adjacent the subterranean formation to form a fluid-permeable pack capable of reducing or substantially preventing the passage of formation fines from the subterranean formation into a wellbore while allowing passage of formation fluids from the subterranean formation into the wellbore.

DETAILED DESCRIPTION

An invert emulsion is a complex heterogeneous fluid. Invert emulsions could be described as a polar fluid emulsified as the internal phase with a non-polar fluid as the continuous phase. Invert emulsions can facilitate drilling operations and completion operations.

The inventors hereof have found that the use of dissolved salts in alcohol as the internal phase of invert emulsions can present certain advantages for wellbore treatments such as drilling and gravel pack operations. Invert emulsions such as drilling fluids and gravel pack fluids can be made denser by using weighting solids. However, using dissolved salts in the internal phase of invert emulsions can increase the density of the internal phase thus reducing the amount of weighting solids required to achieve the same density. Weighting solids can contribute to the increase of frictional pressure when the invert emulsions are circulated in a wellbore. Thus by reducing the amount of weighting solids, the equivalent circulating density of the fluids may be reduced, which may improve drilling hydraulics and efficiencies. As used herein, the term "equivalent circulating density" or "ECD" refers to the effective density exerted by a circulating fluid against a subterranean formation, which takes into account the pressure increase in the annulus above the point being evaluated.

The internal phase of the invert emulsions disclosed herein contains an alcohol component and is non-aqueous based. The thermal conductivity of hydroxyl groups in the alcohol component is relative less than the thermal conductivity of water. Accordingly, the invert emulsions as disclosed herein may help to decrease the bottom hole circulating temperatures.

As disclosed herein, the invert oil emulsion wellbore fluids having improved ECD and other thermal properties comprise an oil phase, an emulsifier, and an internal phase having an alcohol and a salt dissolved in the alcohol.

The oil phase in the invert oil emulsion wellbore fluids is the continuous or external phase, and may comprise any oil including, but not limited to, a diesel oil; a paraffin oil; a vegetable oil; a soybean oil; a mineral oil; a crude oil; a gas oil; kerosene, an aliphatic solvent, an aromatic solvent; a synthetic oil; or a combination comprising at least one of the foregoing.

The emulsifiers used are the same ones typically used in water-in-oil emulsions. These include various fatty acid and derivatives thereof, clay, polymers such as polyamides, or a combination comprising at least one of the foregoing. Exemplary fatty acid derivatives include fatty acid soaps, such as the calcium soaps, which can be prepared by reacting a fatty acid with lime.

The internal phase of the invert oil emulsion wellbore fluids contains an alcohol and a salt dissolved in the alcohol. Preferably the alcohol and the salt are selected such that the salt is dissolvable in the alcohol. As used herein, "dissolvable" means that the salt has a solubility in the alcohol of greater than about 3 g/100 ml, preferably greater than about 10 g/100 ml, more preferably greater than about 15 g/100 ml at 23° C.

Suitable salts include alkali halides, alkaline earth halides, alkali nitrates, alkaline earth nitrates, alkali formates, alkali acetate, alkali phosphates, zinc halides, rare earth halides, and rare earth nitrates. Exemplary salts include sodium chloride, sodium bromide, potassium chloride, potassium bromide, calcium chloride, sodium formate, potassium formate, sodium acetate, potassium acetate, sodium phosphate, and potassium phosphate. Combinations of the salts can be used. In an embodiment the internal phase contains at least one of alkali formates, alkali acetate, or alkali phosphates. The amount of the soluble salts in the internal phase is about 3 wt. % to about 75 wt. %, preferably about 10 wt. % to about 75 wt. %, more preferably about 15 wt. % to about 75 wt. %, based on the total weight of the internal phase.

Suitable alcohols include $C_{1-20}$ aliphatic having from 1 to 6 or 1 to 4 hydroxy groups, $C_{5-20}$ aromatic alcohols having from 1 to 6 or 1 to 4 hydroxy groups, or oligomers and polymers thereof. In addition to hydroxy groups, the alcohols can include other functional groups such as amines. Examples of suitable alcohols include monoethanolamine, ethylene glycol, methyl alcohol, n-propyl alcohol, n-butyl alcohol, n-amyl alcohol, iso-amyl alcohol, and benzyl alcohol. In an embodiment, the alcohol is acyclic. Glycol is specifically mentioned. Solubility of salts in alcohols can be found, for example, in "Solubilities of Inorganic and Organic Compounds: A Compilation of Solubility Data from the Periodical Literature," Seidell and Linke, $2^{nd}$ Edition. A solubility chart of exemplary salts in alcohols is shown below as disclosed by Seidell and Linke.

| Salt | Solvent | Temperature, ° C. | Solubility, wt. % |
|---|---|---|---|
| Calcium Chloride | Monoethanolamine | 25 | 12.3 |
| Calcium Chloride | Ethylene glycol | 25 | 17.1 |
| Calcium Bromide | Methyl alcohol | 20 | 56.2 |
| Calcium Bromide | n-Propyl alcohol | 20 | 22.5 |
| Calcium Bromide | n-butyl alcohol | 20 | 33.9 |
| Calcium Bromide | n-amyl alcohol | 20 | 25.3 |
| Calcium Bromide | iso-amyl alcohol | 20 | 25.6 |
| Calcium Bromide | Benzyl alcohol | 20 | 15 |

In order to achieve the desired ECD and other thermal properties, the alcohols in the internal phase of the invert emulsions disclosed herein do not contain any polycyclicpolyetherpolyols such as those disclosed in U.S. Pat. No. 5,198,416.

Cyclicetherpolyols such as those described in U.S. Pat. Nos. 5,072,794 and 5,198,416 may be used if the cyclicetherpolyols and the salts are selected such that the salt has a solubility in the alcohol of greater than about 3 g/100 ml, preferably greater than about 10 g/100 ml, more preferably greater than about 15 g/100 ml at 23° C. U.S. Pat. Nos. 5,072,794 and 5,198,416 teach a method of using an OBM fluid composition with an internal phase to reduce shale hydration and dispersion by controlling water activity. Shale dispersion is heavily influenced by water activity. The teachings of U.S. Pat. No. 5,072,794 is limited to an internal phase of solely alcohols. U.S. Pat. No. 5,198,416 teaches the use of polycyclicpolyetherpolyols with a molecular weight in excess of 50,000 Daltons as internal phase, and such polycyclicpolyetherpolyols are excluded from the alcohol disclosed herein.

In some embodiments, the internal phase of the invert oil emulsion wellbore fluids is free of water. The internal phase of the invert oil emulsion wellbore fluids can be solid free.

The suitable amount of the internal phases in the invert emulsions can be adjusted based on the formation conditions. In an embodiment, the internal phase is present in an amount of about 5 vol. % to about 90 vol. %, preferably about 15 vol. % to about 80 vol. %, more preferably about 30 vol. % to about 70 vol. %, based on the total volume of the invert oil emulsion wellbore fluids.

Known additives typically used in drilling fluids and gravel pack fluids can also be used provided that the additives do not adversely affect the desired properties of the invert oil emulsion wellbore fluids. Additives include weighting materials, rheology modifiers, viscosifiers, defoamers, fluid loss agents, bentonite, lubricants, or a combination comprising at least one of the foregoing.

Exemplary weighting agents include barite, galena, ilmenite, iron oxides, siderite, manganese tetraoxide, calcite, and the like. As discussed herein, using an internal phase having dissolved salts allows for reduced weighting solids. Thus in an embodiment, the invert oil emulsion wellbore fluids contain less than about 45 vol. % of weighting solids, preferably less than about 30 vol. % of weighting solids, more preferably less than about 20 vol. % of weighting solids while achieving a density of about 8.5 lb/gal to about 20 lb/gal, preferably about 10 lb/gal to about 18 lb/gal, more preferably about 12 lb/gal to about 18 lb/gal.

The invert oil emulsion wellbore fluids can be used in various applications. In an embodiment, the invert oil emulsion wellbore fluids are drilling fluids. A method of drilling a wellbore in a subterranean formation comprises circulating a drilling fluid as disclosed herein in the subterranean formation. The circulation path of the drilling fluid typically extends from the drilling rig down through the drill pipe string to the bit face and back up through the annular space between the drill pipe string and wellbore face to the wellhead and/or riser, returning to the rig.

The drilling fluid performs a number of functions as it circulates through the wellbore including cooling and lubricating the drill bit, removing drill cuttings from the wellbore, aiding in support of the drill pipe and drill bit, and providing a hydrostatic head to maintain the integrity of the wellbore walls and prevent well blowouts. The drilling fluid also desirably prevents sloughing and wellbore cave-ins when drilling through water sensitive formations. Advantageously, using the drilling fluids as disclosed herein may lead to reduced ECD, and/or desirable thermal properties in the wellbore.

The invert oil emulsion wellbore fluids can also be gravel pack fluids. In an embodiment, the gravel pack fluids comprise an invert emulsion as disclosed herein and a gravel material. Gravel pack fluids can be prepared by combining an invert emulsion with gravel. A gravel packing operation may be carried out on a wellbore that penetrates a subterranean formation to prevent or substantially reduce the production of formation particles into the wellbore from the formation during production of formation fluids. The subterranean formation may be completed so as to be in communication with the interior of the wellbore by any suitable method known in the art, for example by perforations in a cased wellbore, and/or by an open hole section.

Fines migration control methods may use a gravel packing fluid as disclosed herein to form a pack of particulate material within a wellbore that it is permeable to fluids produced from a wellbore, such as oil, gas, or water, but that substantially prevents or reduces production of formation materials, such as formation sand, from the formation into the wellbore. Such methods may or may not employ a gravel packing screen, and may be introduced into a wellbore at pressures below, at or above the fracturing pressure of the formation, such as frac pack.

If a screen assembly is used, the screen assembly such as is known in the art may be placed or otherwise disposed within the wellbore so that at least a portion of the screen assembly is disposed adjacent the subterranean formation. Then a wellbore fluid including the invert emulsion and gravel can then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore.

Set forth are various embodiments of the disclosure.

Embodiment 1

A method of drilling a wellbore in a subterranean formation, the method comprising: circulating an invert oil emulsion drilling fluid in the subterranean formation, the invert oil emulsion drilling fluid comprising: an oil phase; an emulsifier; and an internal phase comprising an alcohol other than a polycyclicpolyetherpolyol with molecular weight in excess of 50,000 Daltons and a salt dissolved in the alcohol, wherein the alcohol and the salt are selected such that the salt has a solubility in the alcohol of greater than about 3 g/100 ml at 23° C.

Embodiment 2

The method of drilling a wellbore according to any one of the preceding embodiments, wherein the salt comprises alkali halides, alkaline earth halides, alkali nitrates, alkaline earth nitrates, alkali formates, alkali acetate, alkali phosphates, zinc halides, rare earth halides, rare earth nitrates, or a combination comprising at least one of the foregoing.

Embodiment 3

The method of drilling a wellbore according to any one of the preceding embodiments, wherein the alcohol comprises a $C_{1-20}$ aliphatic alcohol having from 1 to 6 hydroxy groups, a $C_{5-20}$ aromatic alcohol having 1 to 6 hydroxy groups, an oligomer or polymer of the $C_{1-20}$ aliphatic alcohol, an oligomer or polymer of the $C_{5-20}$ aromatic alcohol, a cyclicetherpolyol, or a combination comprising at least one of the foregoing.

Embodiment 4

The method of drilling a wellbore according to any one of the preceding embodiments, wherein the alcohol comprises glycol, monoethanolamine, methyl alcohol, n-propyl alcohol, n-butyl alcohol, n-amyl alcohol, iso-amyl alcohol, benzyl alcohol, or a combination comprising at least one of the foregoing.

Embodiment 5

The method of drilling a wellbore according to any one of the preceding embodiments, wherein the salt is present in an amount of about 3 wt. % to about 75 wt. % of based on the total weight of the internal phase of the drilling fluid.

Embodiment 6

The method of drilling a wellbore according to any one of the preceding embodiments, wherein the drilling fluid comprises less than 45 vol. % of weighting solids based on the total weight of the drilling fluid.

Embodiment 7

The method of drilling a wellbore according to any one of the preceding embodiments, wherein the internal phase is free of water.

Embodiment 8

A method of forming a gravel pack, the method comprising: introducing into the formation a gravel pack fluid comprising an invert emulsion and a gravel, the invert emulsion comprising: an oil phase; an emulsifier; and an internal phase comprising an alcohol other than a polycyclicpolyetherpolyol with molecular weight in excess of 50,000 Daltons and a salt dissolved in the alcohol, the alcohol and the salt being selected such that the salt has a solubility in the alcohol of greater than about 3 g/100 ml at 23° C.; and placing the gravel adjacent the subterranean formation to form a fluid-permeable pack capable of reducing or substantially preventing the passage of formation fines from the subterranean formation into a wellbore while allowing passage of formation fluids from the subterranean formation into the wellbore.

Embodiment 9

The method of forming a gravel pack according to any one of the preceding embodiments, wherein the salt comprises alkali halides, alkaline earth halides, alkali nitrates, alkaline earth nitrates, alkali formates, alkali acetate, alkali phosphates, zinc halides, rare earth halides, rare earth nitrates, or a combination comprising at least one of the foregoing.

Embodiment 10

The method of forming a gravel pack according to any one of the preceding embodiments, wherein the alcohol comprises a $C_{1-20}$ aliphatic alcohol having from 1 to 6 hydroxy groups, a $C_{5-20}$ aromatic alcohol having 1 to 6 hydroxy groups, an oligomer or polymer of the $C_{1-20}$ aliphatic alcohol, an oligomer or polymer of the $C_{5-20}$ aromatic alcohol, a cyclicetherpolyol, or a combination comprising at least one of the foregoing.

Embodiment 11

The method of forming a gravel pack according to any one of the preceding embodiments, wherein the alcohol comprises glycol, monoethanolamine, methyl alcohol, n-propyl alcohol, n-butyl alcohol, n-amyl alcohol, iso-amyl alcohol, benzyl alcohol, or a combination comprising at least one of the foregoing.

Embodiment 12

The method of forming a gravel pack according to any one of the preceding embodiments, wherein the salt is present in an amount of about 3 wt. % to about 75 wt. % of based on the total weight of the internal phase of the invert emulsion.

Embodiment 13

The method of forming a gravel pack according to any one of the preceding embodiments further comprising forming the gravel pack fluid by combining the invert emulsion with the gravel, wherein the invert emulsion is solid free.

Embodiment 14

An invert oil emulsion wellbore fluid comprising: an oil phase; an emulsifier; and an internal phase comprising an alcohol and a salt dissolved in the alcohol, wherein the alcohol other than a polycyclicpolyetherpolyol with molecular weight in excess of 50,000 Daltons and the alcohol and the salt are selected such that the salt has a solubility in the alcohol of greater than about 3 g/100 ml at 23° C., and the wellbore fluid is a drilling fluid or a gravel pack fluid.

Embodiment 15

The invert oil emulsion wellbore fluid of any one of the preceding embodiments, wherein the salt comprises alkali halides, alkaline earth halides, alkali nitrates, alkaline earth nitrates, alkali formates, alkali acetate, alkali phosphates, zinc halides, rare earth halides, rare earth nitrates, or a combination comprising at least one of the foregoing.

Embodiment 16

The invert oil emulsion wellbore fluid of any one of the preceding embodiments, wherein the alcohol comprises glycol, monoethanolamine, methyl alcohol, n-propyl alcohol, n-butyl alcohol, n-amyl alcohol, iso-amyl alcohol, benzyl alcohol, or a combination comprising at least one of the foregoing.

Embodiment 17

The invert oil emulsion wellbore fluid of any one of the preceding embodiments, wherein the wellbore fluid is a drilling fluid.

Embodiment 18

The invert oil emulsion wellbore fluid of any one of the preceding embodiments, wherein the wellbore fluid is a gravel pack fluid, and the wellbore fluid further comprises gravel.

Embodiment 19

The invert oil emulsion wellbore fluid of any one of the preceding embodiments, wherein the salt is present in an amount of about 3 wt. % to about 75 wt. % of based on the total weight of the internal phase of the invert oil emulsion wellbore fluid.

Embodiment 20

The invert oil emulsion wellbore fluid of any one of the preceding embodiments, wherein the wellbore fluid comprises less than 45 vol. % of weighting solids based on the total weight of the wellbore fluid.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A method of drilling a wellbore in a subterranean formation, the method comprising:
    circulating an invert oil emulsion drilling fluid in the subterranean formation, the invert oil emulsion drilling fluid comprising:
        an oil phase;
        an emulsifier; and
        an internal phase comprising an alcohol other than a polycyclicpolyetherpolyol with molecular weight in excess of 50,000 Daltons and a salt dissolved in the alcohol,
    wherein the alcohol and the salt are selected such that the salt has a solubility in the alcohol of greater than about 3 g/100 ml at 23° C., and
    the invert emulsion comprises less than about 20 vol. % of weighting solids while achieving a density of 12 lb/gal to 18 lb/gal.

2. The method of claim 1, wherein the salt comprises alkali halides, alkaline earth halides, alkali nitrates, alkaline earth nitrates, alkali formates, alkali acetate, alkali phosphates, zinc halides, rare earth halides, rare earth nitrates, or a combination comprising at least one of the foregoing.

3. The method of claim 1, wherein the alcohol comprises a $C_{1-20}$ aliphatic alcohol having from 1 to 6 hydroxy groups, a $C_{5-20}$ aromatic alcohol having 1 to 6 hydroxy groups, an oligomer or polymer of the $C_{1-20}$ aliphatic alcohol, an oligomer or polymer of the $C_{5-20}$ aromatic alcohol, a cyclicetherpolyol, or a combination comprising at least one of the foregoing.

4. The method of claim 1, wherein the alcohol comprises glycol, monoethanolamine, methyl alcohol, n-propyl alcohol, n-butyl alcohol, n-amyl alcohol, iso-amyl alcohol, benzyl alcohol, or a combination comprising at least one of the foregoing.

5. The method of claim 1, wherein the salt is present in an amount of about 3 wt. % to about 75 wt. % of based on the total weight of the internal phase of the drilling fluid.

6. The method of claim 1, wherein the internal phase is free of water.

7. A method of forming a gravel pack, the method comprising:
    introducing into the formation a gravel pack fluid comprising
        an invert emulsion and a gravel,
        the invert emulsion comprising:
            an oil phase;
            an emulsifier; and
            an internal phase comprising an alcohol other than a polycyclicpolyetherpolyol with molecular weight in excess of 50,000 Daltons and a salt dissolved in the alcohol, the alcohol and the salt being selected such that the salt has a solubility in the alcohol of greater than about 3 g/100 ml at 23° C.; and placing the gravel adjacent the subterranean formation to form a fluid-permeable pack capable of reducing or substantially preventing the passage of formation fines from the subterranean formation into a wellbore while allowing passage of formation fluids from the subterranean formation into the wellbore, wherein the invert emulsion comprises less than about 20 vol. % of weighting solids while achieving a density of 12 lb/gal to 18 lb/g.

8. The method of claim 7, wherein the salt comprises alkali halides, alkaline earth halides, alkali nitrates, alkaline earth nitrates, alkali formates, alkali acetate, alkali phosphates, zinc halides, rare earth halides, rare earth nitrates, or a combination comprising at least one of the foregoing.

9. The method of claim 7, wherein the alcohol comprises a $C_{1-20}$ aliphatic alcohol having from 1 to 6 hydroxy groups, a $C_{5-20}$ aromatic alcohol having 1 to 6 hydroxy groups, an oligomer or polymer of the $C_{1-20}$ aliphatic alcohol, an oligomer or polymer of the $C_{5-20}$ aromatic alcohol, a cyclicetherpolyol, or a combination comprising at least one of the foregoing.

10. The method of claim 7, wherein the alcohol comprises glycol, monoethanolamine, methyl alcohol, n-propyl alcohol, n-butyl alcohol, n-amyl alcohol, iso-amyl alcohol, benzyl alcohol, or a combination comprising at least one of the foregoing.

11. The method of claim 7, wherein the salt is present in an amount of about 3 wt. % to about 75 wt. % of based on the total weight of the internal phase of the invert emulsion.

12. An invert oil emulsion wellbore fluid comprising:
an oil phase;
an emulsifier; and
an internal phase comprising an alcohol and a salt dissolved in the alcohol,
wherein the alcohol other than a polycyclicpolyetherpolyol with molecular weight in excess of 50,000 Daltons and the alcohol and the salt are selected such that the salt has a solubility in the alcohol of greater than about 3 g/100 ml at 23° C., and
the wellbore fluid is a drilling fluid or a gravel pack fluid,
wherein the invert emulsion comprises less than about 20 vol. % of weighting solids while achieving a density of 12 lb/gal to 18 lb/gal.

13. The invert oil emulsion wellbore fluid of claim 12, wherein the salt comprises alkali halides, alkaline earth halides, alkali nitrates, alkaline earth nitrates, alkali formates, alkali acetate, alkali phosphates, zinc halides, rare earth halides, rare earth nitrates, or a combination comprising at least one of the foregoing.

14. The invert oil emulsion wellbore fluid of claim 13, wherein the alcohol comprises glycol, monoethanolamine, methyl alcohol, n-propyl alcohol, n-butyl alcohol, n-amyl alcohol, iso-amyl alcohol, benzyl alcohol, or a combination comprising at least one of the foregoing.

15. The invert oil emulsion wellbore fluid of claim 13, wherein the wellbore fluid is a drilling fluid.

16. The invert oil emulsion wellbore fluid of claim 13, wherein the wellbore fluid is a gravel pack fluid, and the wellbore fluid further comprises gravel.

17. The invert oil emulsion wellbore fluid of claim 13, wherein the salt is present in an amount of about 3 wt. % to about 75 wt. % of based on the total weight of the internal phase of the invert oil emulsion wellbore fluid.

18. The invert oil emulsion wellbore fluid of claim 12, wherein the alcohol comprises glycol, monoethanolamine, n-propyl alcohol, n-butyl alcohol, n-amyl alcohol, iso-amyl alcohol, benzyl alcohol, or a combination comprising at least one of the foregoing.

19. The invert oil emulsion wellbore fluid of claim 12, wherein the salt comprises alkali nitrates, alkaline earth nitrates, alkali phosphates, zinc halides, rare earth halides, rare earth nitrates, or a combination comprising at least one of the foregoing.

20. The invert oil emulsion wellbore fluid of claim 12, wherein the salt comprises sodium phosphate, potassium phosphate, or a combination comprising at least one of the foregoing.

21. The invert oil emulsion wellbore fluid of claim 12, wherein the alcohol and the salt are selected such that the salt has a solubility in the alcohol of greater than about 10 g/100 ml at 23° C.

22. The invert oil emulsion wellbore fluid of claim 12, wherein the alcohol and the salt are selected such that the salt has a solubility in the alcohol of greater than about 15 g/100 ml at 23° C.

* * * * *